(12) United States Patent
Bugenhagen et al.

(10) Patent No.: US 7,881,281 B1
(45) Date of Patent: *Feb. 1, 2011

(54) BORDER CONTROL SYSTEM, METHOD, AND SOFTWARE

(75) Inventors: Michael K. Bugenhagen, Olathe, KS (US); Matthew C. Schlesener, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1978 days.

This patent is subject to a terminal disclaimer.

(21) Appl. No.: 10/884,129

(22) Filed: Jul. 2, 2004

(51) Int. Cl.
*H04L 12/66* (2006.01)

(52) U.S. Cl. .................. 370/352; 379/220.01; 379/243

(58) Field of Classification Search .......... 370/352–365
See application file for complete search history.

(56) References Cited

U.S. PATENT DOCUMENTS

| | | | |
|---|---|---|---|
| 6,259,691 B1 | 7/2001 | Naudus | |
| 6,584,083 B1 * | 6/2003 | Toporek et al. | 370/316 |
| 6,587,454 B1 | 7/2003 | Lamb | |
| 6,934,745 B2 | 8/2005 | Krautkremer | |
| 6,937,575 B1 | 8/2005 | Galich et al. | |
| 7,038,574 B1 * | 5/2006 | Schlesener et al. | 340/286.02 |
| 7,120,682 B1 * | 10/2006 | Salama | 709/222 |
| 7,293,080 B1 | 11/2007 | Clemm et al. | |
| 7,457,290 B1 | 11/2008 | Salama et al. | |
| 2002/0101860 A1 * | 8/2002 | Thornton et al. | 370/352 |
| 2003/0123436 A1 * | 7/2003 | Joseph et al. | 370/352 |
| 2003/0202521 A1 * | 10/2003 | Havinis et al. | 370/401 |
| 2006/0098577 A1 * | 5/2006 | MeLampy et al. | 370/238 |

OTHER PUBLICATIONS

Schlesener, Matthew C., "Performance Evaluation of Telephony Routing over IP (TRIP)," submitted to the Department of Electrical Engineering and Computer Science and the Faculty of the Graduate School of the University of Kansas in partial fulfillment of the requirements for the degree of Master's of Science.

* cited by examiner

*Primary Examiner*—Fan Tsang
*Assistant Examiner*—Ibraham Sharifzada (57) ABSTRACT

A communication network comprising a plurality of border controllers, a first packet voice network, a second packet voice network coupled to the first packet network by the plurality of border controllers, and a master border controller coupled to the plurality of border controllers and coupled to the first packet voice network and the second packet voice network. The master border controller, responsive to receiving a query from a switch in the first packet voice network for a call between the first and second packet voice networks, processes the query to determine a first border controller for the call of the plurality of border controllers, and transfers a response to the switch in the first packet network wherein the response indicates the first border controller.

21 Claims, 9 Drawing Sheets

| BC | Net #1 | Net #2 | Status |
|---|---|---|---|
| 531 | 510 | 520 | 1 |
| 532 | 510 | 520 | 0 |
| 533 | 510 | 520 | 1 |
| 581 | 510 | 580 | 1 |
| 582 | 510 | 580 | 1 |
| 583 | 510 | 580 | 0 |

BORDER CONTROL SYSTEM, METHOD, AND SOFTWARE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to controlling borders between packet based networks, and in particular, to border control systems and methods.

2. Description of the Prior Art

Current Voice over Internet Protocol (VoIP) networks route voice communications using the IP format. Essentially, voice communications are converted into packets and transported through IP networks. In an example of a typical VoIP call from an on-net subscriber to an off-net destination, the subscriber to the VoIP network utilizes a phone program on a personal computer connected to the Internet. An application on the computer converts voice communications to packets and transmits the voice packets to the Internet. The packets are then routed to a gateway on a standard switched telephone network such as the public switched telephone network (PSTN). The voice packets are then routed through the PSTN to the destination for the call.

In an example of a typical VoIP call from an on-net subscriber to another on-net subscriber, both users utilize phone programs on their personal computers connected to the Internet. In this case, voice communications are converted to packets and transmitted over the Internet in accordance with routing instructions in the packet headers. The packets are routed in the same fashion as any other type of packet, such as a packet carrying email.

Problematically, VoIP calls suffer from low quality of service and reliability. In both examples of the prior art, VoIP calls are either dumped to the nearest gateway and then routed on the PSTN, or the calls are routed over the Internet and suffer from low quality. In either case, intelligent routing decisions are not made to choose an optimal route, gateway, or otherwise.

One solution in the prior art to solve the persistent problems of low quality and reliability involves implementing dedicated VoIP networks. Unfortunately, stand alone dedicated VoIP networks are only able to provide high quality of service for a call between two subscribers to the dedicated VoIP service. If a call must reach the PSTN, dedicated VoIP networks do not possess intelligent gateway selection capabilities. Additionally, for a call that must transit between two competitive dedicated VoIP networks, intelligent border control capabilities do not exist.

Packet voice networks, such as VoIP networks, utilize border controllers to control traffic exchanged across various packet networks. Often times, numerous border controllers are employed between two packet networks. A typical border controller may consist of a firewall and a application server, for example. Packet switches typically perform call setup processing for calls across two packet networks, including choosing the particular border controller for a call.

For calls originating from a host packet network and destined for another competitive packet voice network, the host packet switch is responsible for choosing the border controller for the call. The host packet switch is also responsible for querying a corresponding packet switch in the destination packet network for the network address of the called party. The host packet switch is further responsible for alerting the destination switch of the identity of the chosen border controller. The host packet switch also notifies the calling device of the chosen border controller.

Problematically, requiring a host switch to interface with the destination switch inefficiently places processing burdens on the host switch that could be better directed towards other purposes. Requiring a host switch to choose a border controller also inefficiently burdens the switch. Furthermore, requiring host switches to communicate with several border controllers potentially opens security holes to the packet network of the host switch. Requiring the host switch to notify the destination switch of the chosen border controller creates additional potential security holes into the host packet network. Thus, improved operations between competitive networks is desired.

SUMMARY OF THE INVENTION

An embodiment of the invention solves the above problems as well as other problems by providing systems, methods, and software that reduce processing burdens on host soft switches. An embodiment of the invention also removes potential security holes in packet based voice networks.

An embodiment of the invention includes a communication network comprising a plurality of border controllers, a first packet voice network, a second packet voice network coupled to the first packet network by the plurality of border controllers, and a master border controller coupled to the plurality of border controllers and coupled to the first packet voice network and the second packet voice network. The master border controller, responsive to receiving a query from a switch in the first packet voice network for a call between the first and second packet voice networks, processes the query to determine a first border controller for the call of the plurality of border controllers, and transfers a response to the switch in the first packet network wherein the response indicates the first border controller.

In another embodiment of the invention, the first packet voice network comprises a first switch and a destination element wherein the second packet voice network comprises a second switch and an origination element.

In another embodiment of the invention, the master border controller receives a call request message from the second switch wherein the call request message indicates a proxy origination address for the origination element and a proxy destination address for the destination element and wherein the master border controller transfers the call request message to the first switch in response to determining that the first packet voice network is associated with the proxy destination address.

In another embodiment of the invention, the master border controller transfers a call setup message to the first border controller indicating the proxy origination address and the proxy destination address for the call.

In another embodiment of the invention, the first border controller receives a packet for the call wherein the packet indicates a proxy origin in the first packet network and indicates the first border controller as a proxy destination and wherein the first border controller transfers the packet to the second voice packet network wherein the transferred packet indicates the first border controller as the proxy origin for the call.

In another embodiment of the invention, the first border controller receives the packet for the call and in response to determining the origin for the call, transmits the packet to the destination for the call wherein the packet transmitted from the first border controller indicates the first border controller as the origin for the call and indicates the destination.

In another embodiment of the invention, the master border controller is telephony routing over Internet protocol (TRIP) enabled.

In another embodiment of the invention, the plurality of border controllers are telephony routing over Internet protocol (TRIP) enabled.

In another embodiment of the invention, the origination element comprises a session initiation protocol (SIP) enabled mobile phone.

In another embodiment of the invention, the destination element comprises a session initiation protocol (SIP) enabled mobile phone.

BRIEF DESCRIPTION OF THE DRAWINGS

The same reference number represents the same element on all drawings.

DETAILED DESCRIPTION OF THE PREFERRED EMBODIMENT

FIGS. 3-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Prior Art Example

FIGS. 1-2

Figure 1:
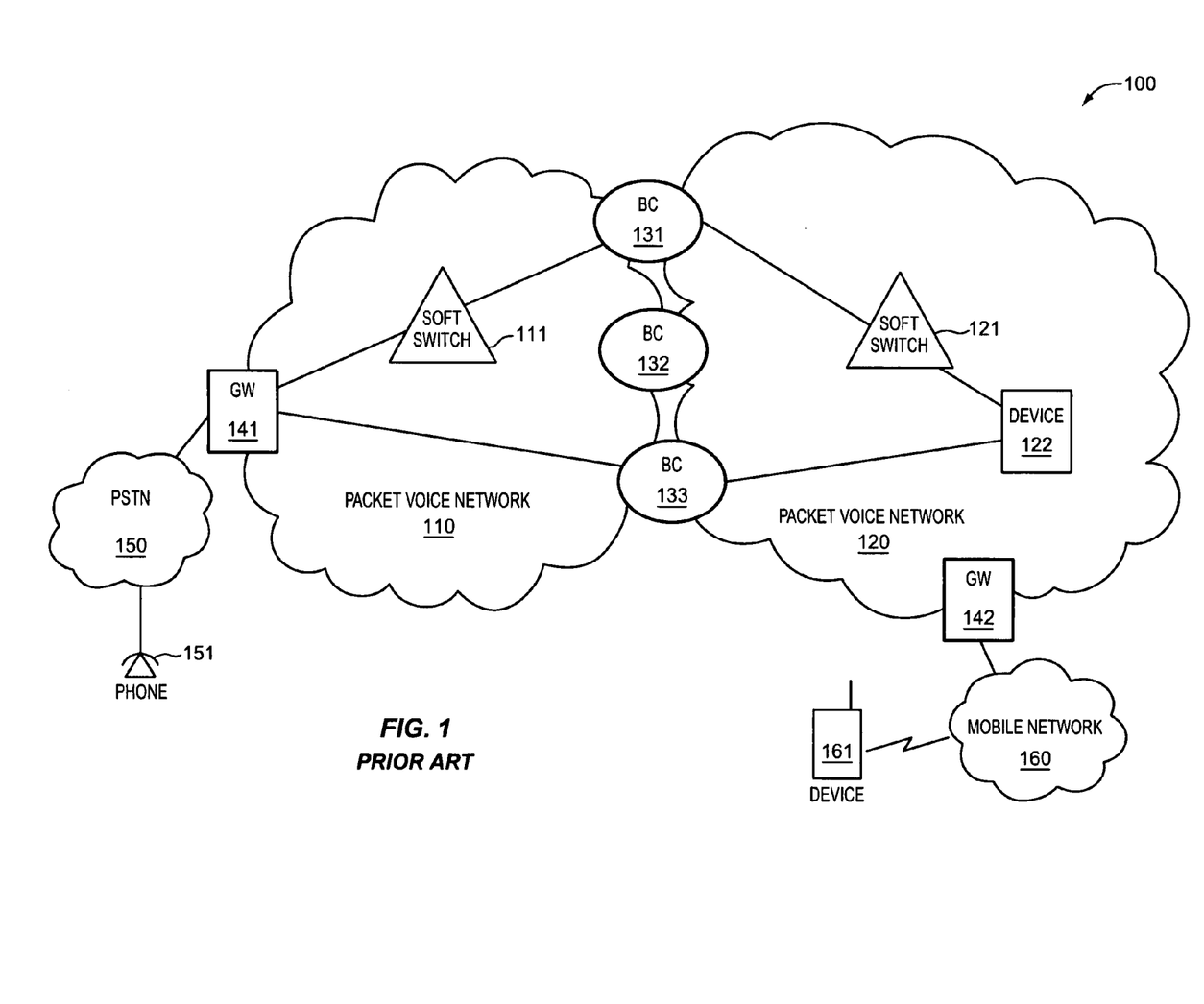
FIG. 1 illustrates a communication network in an example of the prior art.

FIG. 1 illustrates communication network 100 in an example of the prior art. Communication network 100 includes packet voice network 110 and packet voice network 120. Packet voice networks 110 and 120 are competitive networks. Network 110 includes packet switch 111. Packet network 120 includes packet switch 121 and mobile device 122. Border controllers 131, 132, and 133 couple packet network 110 to packet network 120. Gateway 141 couples public switched telephone network (PSTN) 150 to packet network 110. Similarly, gateway 142 couples mobile network 160 to packet network 120. Device 151 is coupled to PSTN 150, and device 161 is coupled to mobile network 160.

Figure 2:
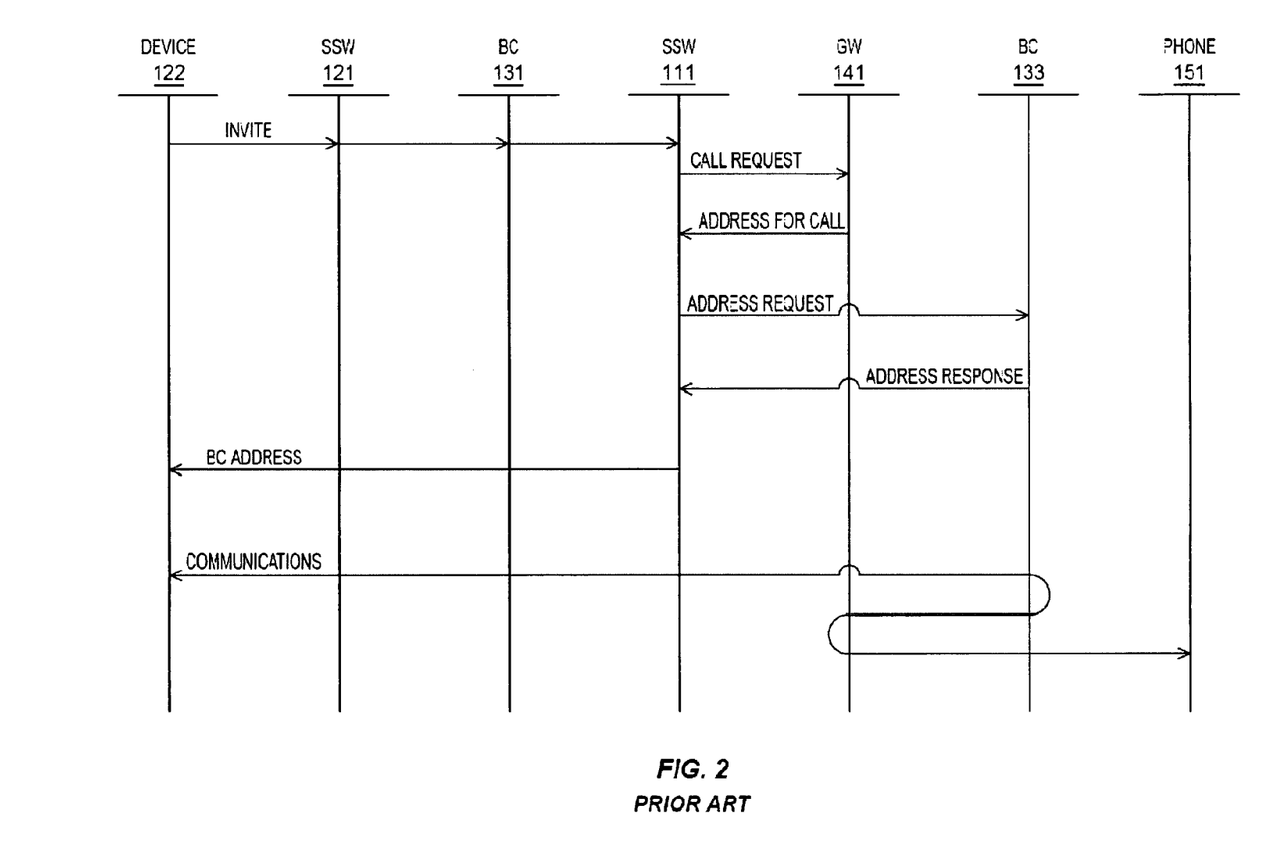
FIG. 2 illustrates the operation of a communication network in an example of the prior art.

FIG. 2 illustrates the operation of communication network 100 in an example of the prior art. In this example, mobile device 122 is a Session Initiation Protocol (SIP) enabled device. SIP is a packet based signaling protocol for packet voice networks well known to those in the art. Switch 121 is commonly referred to in the art as a packet switch, soft switch, or media gateway controller. Switch 121 is SIP and telephony routing over Internet protocol (TRIP) enabled. TRIP is a well known protocol for messaging between soft switches and media gateways. Switch 111 is also TRIP and SIP enabled. Gateway 141 is TRIP-lite enabled. TRIP-lite is a scaled down version of TRIP that resides on gateways for communication between gateways and media gateway controllers such as switches 111 and 121. Further in this example, communication device 151 is a telephone connected to PSTN 150.

Referring again to FIG. 2, device 122 initiates a call to device 151 by first transmitting a SIP invite message for the call to switch 121. The invite message includes the phone number for device 151 and identifies the user of device 122 in the format user@domain.name. The phone number is of the format xxx-xxx-xxxx, wherein the first three digits indicate the area code for device 151. Switch 121 accesses a TRIP routing table to determine the best gateway to reach PSTN 150 for the call. Upon determining that gateway 141 is the best gateway, switch 121 next forwards the SIP invite message to switch 111. The forwarded SIP invite message indicates the phone number for device 151 as well as the network address of device 122.

Upon receiving the forwarded SIP invite message, switch 111 processes the phone number to pick a gateway for the call. In this example, only a single gateway to PSTN 150 is shown, although it is understood that several gateways could interface between packet network 110 and PSTN 150. Switch 111 transmits a call request to gateway 141 including the phone number for device 151. Gateway 141 transmits a call response to switch 111 indicating a network address for a port on gateway 141 to be used for the call. Any communications that reach gateway 141 at the selected port are interworked for PSTN 150, and in turn to device 151.

After receiving the network address for gateway 141 to be used for the call, switch 111 picks a border controller of border controllers 131, 132, and 133 for the call. Assuming switch 111 picks border controller 133, switch 111 then transmits a message to gateway 141 indicating the network address for border controller 133. Additionally, switch 111 informs border controller 133 of the network address of gateway 141 for the call. Switch 111 also informs border controller 133 of the network address for device 122. Lastly, switch 111 informs device 122 of the appropriate-network address for border controller 133.

For communications heading in the direction from device 151 to device 122, gateway 141 addresses the communications to border controller 133. Border controller 133 addresses any communications received from the network address of gateway 141 for the call to device 122. For communications heading in the direction from device 122 to device 141, border controller addresses the communications to gateway 141 using the network address of gateway 141 for the call. Gateway 141 interworks any communications addressed for its network address to PSTN 150, and in turn, to device 151.

The above discussion of the prior art illustrates several problems in the prior art. Requiring soft switch 111 to choose a border controller inefficiently burdens switch 111. Furthermore, requiring host switch 111 to communicate with the several border controllers 131, 132, and 133 potentially opens security holes to the host switch. Requiring host switch 111 to notify destination switch 121 of the chosen border controller creates additional potential security holes into the host packet network.

In another problem with the prior art, switch 111 does not have knowledge of the operations and state of packet network 120 because networks 110 and 110 are owned and operated by competitive entities. Presently, switch 111 determines the route through the various network elements of packet network 110 that carry bearer traffic. Switch 111 holds status information related to the various network elements of packet network 110 and can thereby determine the best possible route through packet network 110 for a call. However, switch 111 does not possess any knowledge capabilities with respect to the various network t of packet network 120. Thus, when choosing which border controller of border controllers 131, 132, and 133, switch 111 is not aware of which border controller is connected to the optimal route for the call through packet network 120.

First Embodiment Configuration and Operation

FIGS. 3-4

Figure 3:
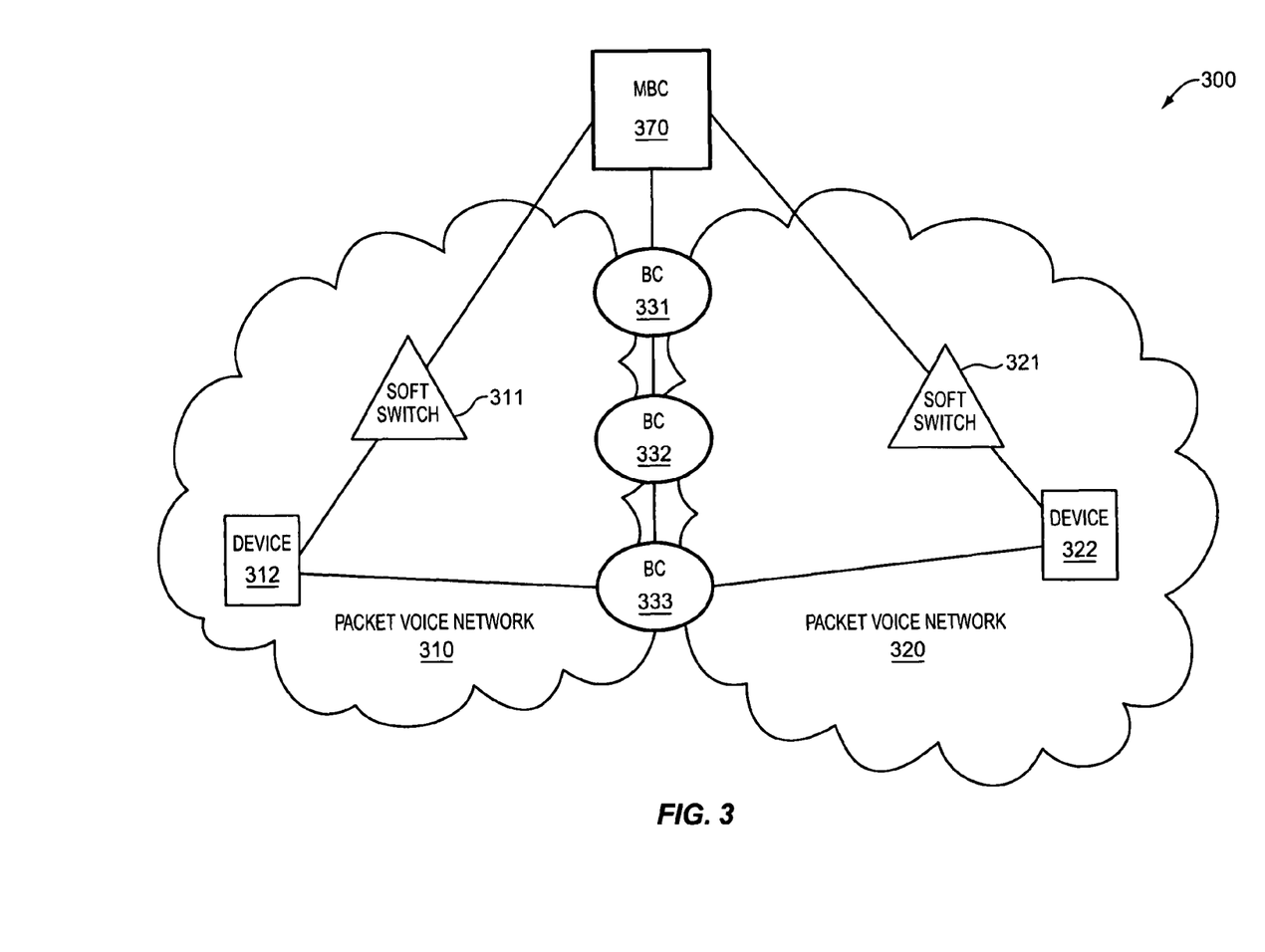
FIG. 3 illustrates a communication network in an embodiment of the invention.

FIG. 3 illustrates communication network 300 in an embodiment of the invention. Communication network 300 includes packet voice network 310 and packet voice network 320. Packet voice network 310 includes soft switch 311 and destination element 312. Packet voice network 320 includes soft switch 321 and origination element 322. Border controllers 331, 332, and 333 couple packet voice network 310 to packet voice network 320. Master border controller 370 is coupled to soft switches 311 and 321 and coupled to border controllers 331, 332, and 333.

Figure 4:
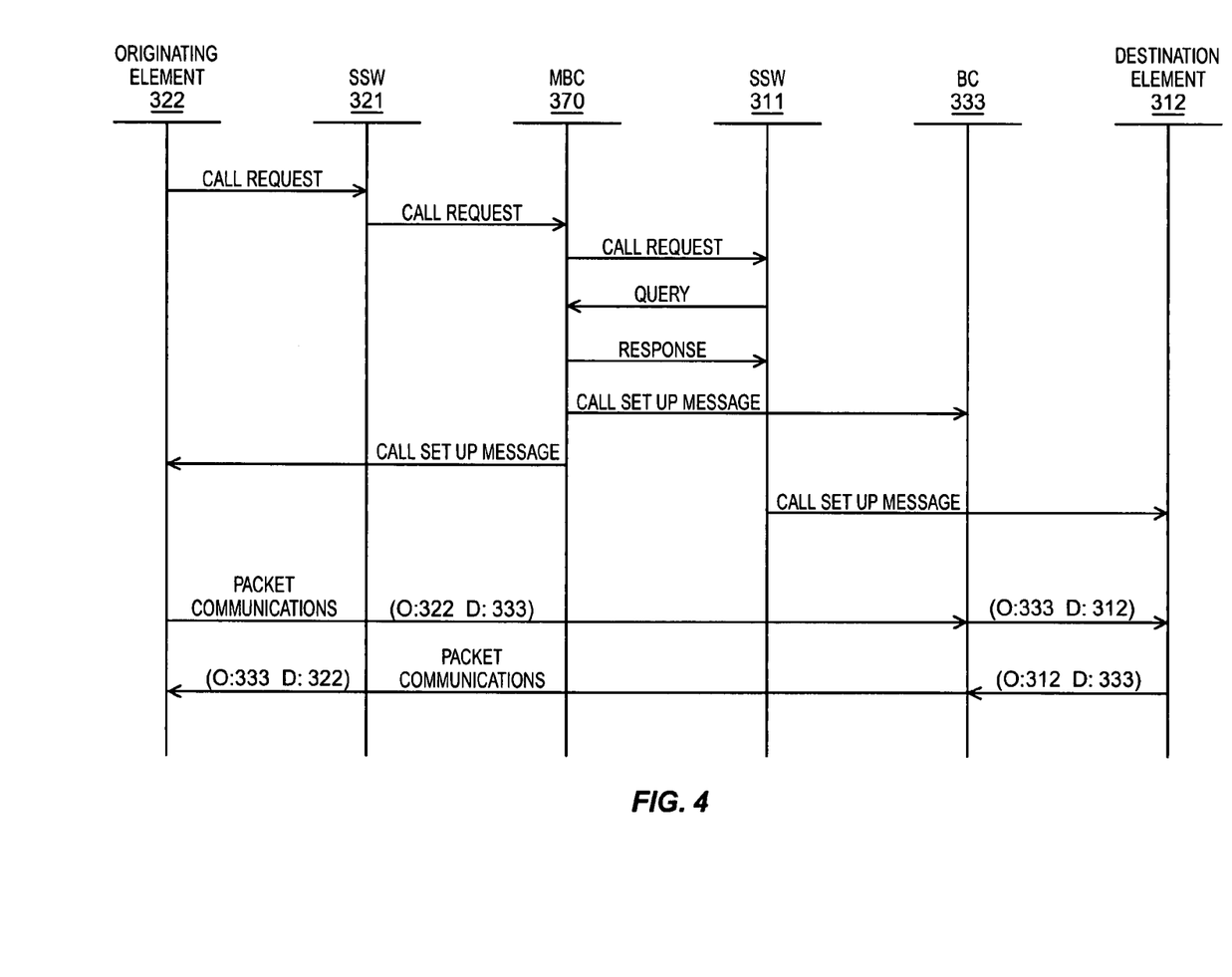
FIG. 4 illustrates the operation of a communication network in an embodiment of the invention.

FIG. 4 illustrates the operation of FIG. 3 in an embodiment of the invention. In particular, FIG. 4 illustrates a call setup sequence diagram for a call from origination element 322 to destination element 312. Origination element 322 could comprise a network node such as a mobile communication device, a gateway to another domain or network, a combination of several network elements, as well other types of network elements. Destination element 312 could comprise a network node such as a mobile communication device, a gateway to another domain, a combination of several network elements, as well other types of network elements. FIG. 3 depicts signaling channels between the various elements of communication network 300. It is understood that bearer channels exist between the various elements of communication network 300, but are not shown for purposes of clarity.

To begin, origination element 322 transmits a call request to switch 321. The call request indicates a proxy origination address for origination element 322 and a proxy destination address. Switch 321 receives and processes the call request. Switch 321 determines that the call is for a destination outside of packet voice network 320 and responsively transfers the call request to master border controller 370. The transferred call request indicates the proxy origination address for origination element 322 and the proxy destination address for destination element 312.

Master border controller receives the call request and processes the proxy destination address to determine which network is associated with the proxy destination address. In an embodiment of the invention, master border controller 370 is coupled to more than two networks. Therefore, master border controller 370 processes the proxy destination address to determine which of the networks is associated with the proxy destination address. Master border controller 370 also determines whether or not signaling protocol conversion is required. For example, two competing network may use different signaling protocols such as SIP, H.323, or SS7, as well as other signaling protocols. Master border controller 370 might receive the call request in the SIP protocol and convert it to H.323, as well as another signaling protocol.

Upon determining that packet voice network 310 is associated with the proxy destination address, master border controller 370 transfers the call request to switch 311. The transferred call request indicates the proxy destination address. The proxy destination address could comprise a user name and domain name in the form of user@domain.com, a phone number for a destination on the PSTN, as well as other types of addresses.

Switch 311 processes the call request in accordance with standard call processing well known to those in the art. For example, switch 311 processes the call request to determine if destination element 312 is available. Switch 311 also processes the call request for billing and operations management. Upon determining that the call can proceed, switch 311 transmits a query to master border controller 370 requesting a border controller for the call. Master border controller 370 processes the query to choose a border controller for the call. Master border controller 370 chooses the border controller based on several factors such as capacity, best route, cost, capabilities, as well as other factors.

After determining that border controller 333 is the optimal choice for the call, master border controller 370 transfers a response to switch 311 indicating border controller 333. Switch 311 transmits a call setup message to destination element 312 indicating border controller 333. Master border controller 370 transmits a call setup message to switch 321 indicating border controller 333. Switch 321 passes the identity of border controller 333 to origination element 322. Master border controller 370 also transmits a call setup message to border controller 333 that identifies origination element 322 and destination element 312.

Communications for the call can commence after call setup is completed. Packets routed in the direction from origination element 322 to destination element 312 arrive at border controller 333 indicating origination element 312 as the source and border controller 333 as the destination. Border controller 333 then forwards the packets to destination element 312. These packets indicate border controller 333 as the source and destination element 312 as the destination. Packets routed in the direction from destination element 312 to origination element 322 arrive at border controller 333 indicating destination element 312 as the source and border controller 333 as the destination. Border controller 333 then forwards the packets to origination element 322. These packets indicate border controller 333 as the source and origination element 322 as the destination.

Advantageously, master border controller 370 determines the best border controller for the call, rather than burdening switch 311 with the responsibility of choosing the best border controller. Master border controller 370 also handles signaling protocol conversion rather than burdening the soft switches with conversion responsibilities. Additionally, master border controller 370 informs switch 321 of the chosen border controller which removes security liabilities present if switch 311 were to pick the border controller and transmit a call setup message to switch 321. Thus, both packet networks 310 and 320 can protect their networks from unauthorized access. Segregating network operations is desirable because packet networks 310 and 320 are competitive networks. Furthermore, master border controller 370 has distributed knowledge of both voice packet networks 310 and 320, thereby enabling master border controller 370 to choose the optimal border controller for the call.

Second Embodiment Configuration and Operation

FIGS. 5-8

Figure 5:
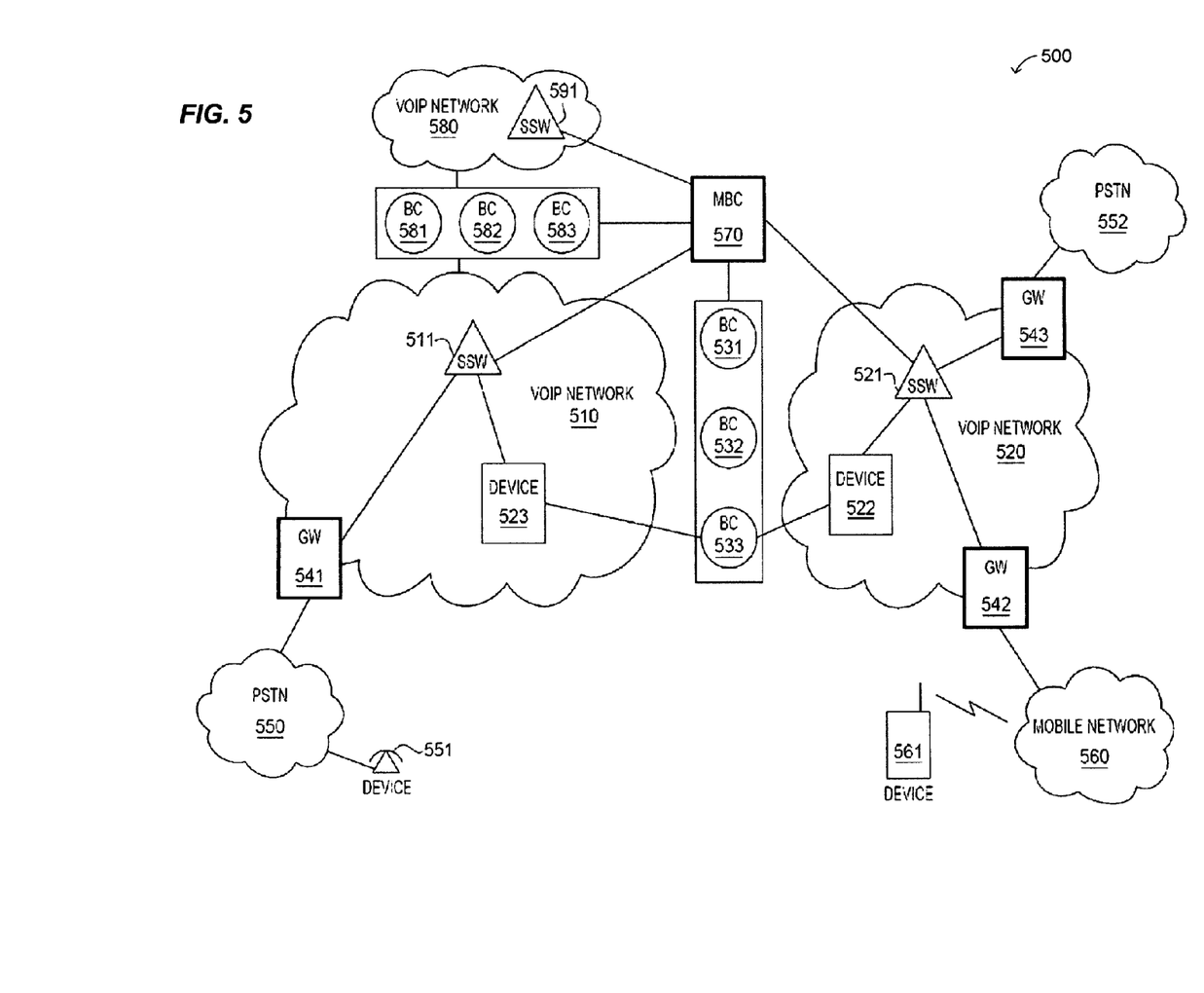
FIG. 5 illustrates a communication network in an embodiment of the invention.

FIG. 5 illustrates communication network 500 in an embodiment of the invention. FIG. 5 includes competitive VoIP networks 510, 520, and 580. Border controllers 531, 532, and 533 couple VoIP network 510 to VoIP network 520. Border controllers 581, 582, and 583 couple VoIP networks 580 and 510. VoIP network 580 includes soft switch 591 which is in communication with master border controller 570. VoIP network 510 includes soft switch 511 and device 523. Soft switch 511 is in communication with master border controller 570. VoIP network 520 includes soft switch 521 and device 522. Soft switch 521 is in communication with master border controller 570. Gateway 541 couples VoIP network 510 with PSTN region 550. Device 551 is in communication through PSTN region 550. Gateway 542 couples VoIP network 520 with mobile communication network 560. Device 561 is in communication through mobile communication network 560. Gateway 543 couples VoIP network 520 with PSTN region 552.

Soft switches 511 and 521 are TRIP and SIP enabled. Similarly, devices 523 and 522 are SIP enabled devices. Gateways 541, 542, and 543 are TRIP-lite enabled gateways. TRIP-lite is a version of TRIP applicable to media gateways. Device 551 comprises a communication device such as a plain old telephone service (POTS) device. Device 561 comprises a wireless device such as a PDA, PCS phone, or other types of wireless devices. Border controllers 531, 532, and 533 are TRIP or TRIP-lite enabled border controllers. Master border controller 570 is a TRIP and SIP enabled master border controller.

It is assumed that the user of device 522 is a subscriber of the operating entity of VoIP network 520, and that the user of device 523 is a subscriber of the operating entity of VoIP network 510. The operating entity of VoIP network 520 could be the owner or part owner of VoIP network 520. The operating entity could also be a service provider that leases VoIP network 520, as well as having some other type of business relationship with VoIP network 510. The operating entity of VoIP network 510 could be the owner or part owner of VoIP network 510. The operating entity could also be a service provider that leases VoIP network 510, as well as having some other type of business relationship with VoIP network 510. The operating entities of VoIP network 510 and 520 are competitive entities against each other. For example, VoIP network 520 could be operated by Sprint Corporation, and VoIP network 510 by Verizon.

Figure 6:
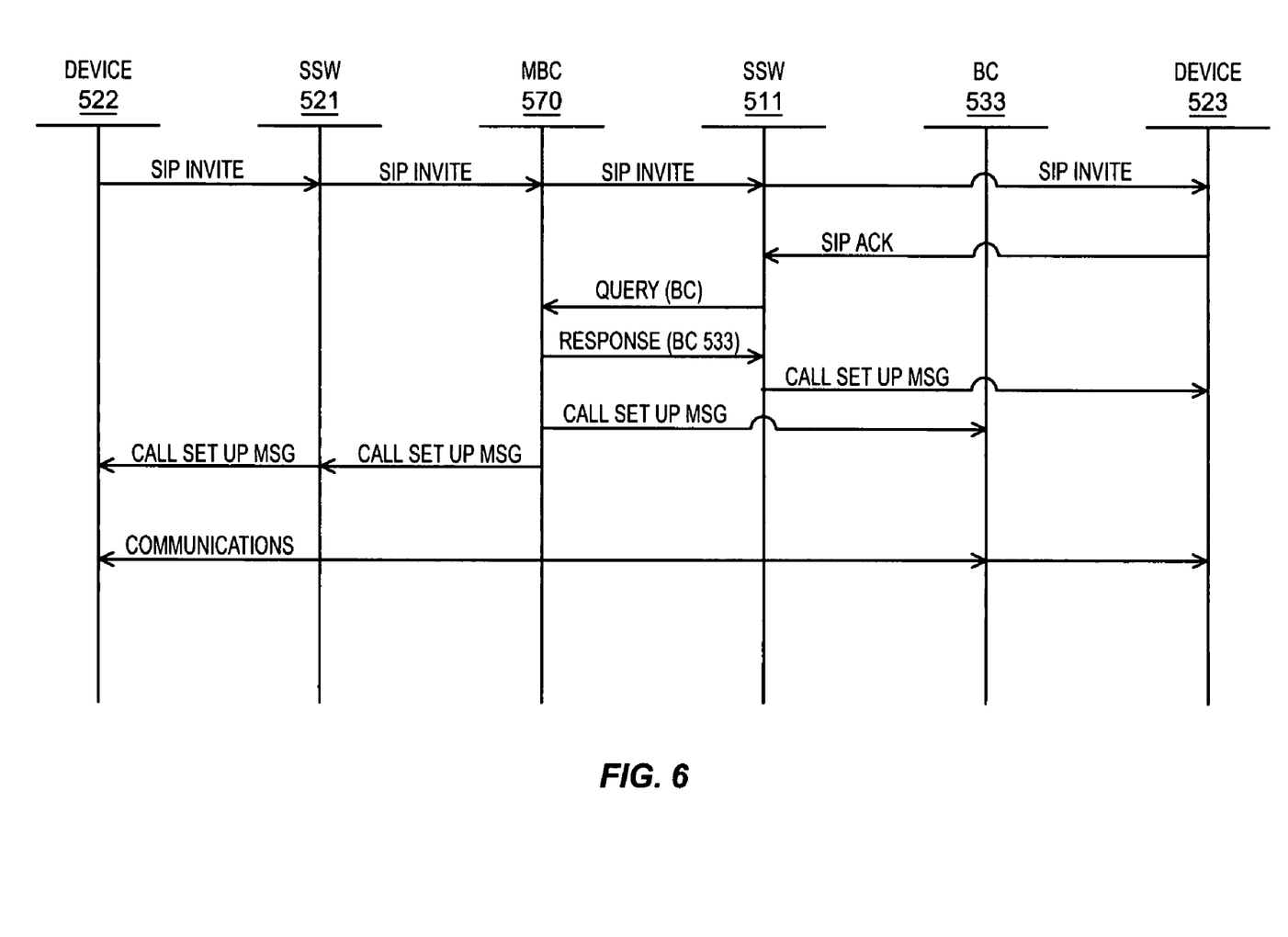
FIG. 6 illustrates the operation of a communication network in an embodiment of the invention.

FIG. 6 illustrates the operation of communication network 500 in an embodiment of the invention. In this illustration, a voice call is placed from SIP device 522 to SIP device 523. Devices 522 and 523 could comprise communication devices such as VoIP wireless phones, VoIP wireline phones, PDAs, as well as other communication devices. The call requires connecting the users of devices 522 and 523 across two competitive VoIP networks 510 and 520.

To begin, device 522 transfers a SIP invite message to soft switch 521. The SIP invite message indicates a proxy address for device 522. The proxy address is in the format user@domain.com. For example, the proxy address could identify the name of the user along with the domain the user belongs to, such as, john.smith@acme.com. The SIP invite message also indicates a proxy address for the user of device 523 in a similar format, such as, sally.jones@corporation.com. Prior to transmitting the SIP invite message, device 522 registered with VoIP network 520 by alerting switch 521 of its presence in the network. In response, switch 521 assigned device 522 a network address. The network address could be in the form of an IP address. Switch 521 therefore stores the network address (IP address) of device 522 in association with the proxy address (john.smith@acme.com) of device 522.

Switch 521 recognizes from the SIP invite message that the destination for the requested call from device 522 is outside of VoIP network 520. Rather than automatically dump the call to PSTN region 552 through gateway 543, as done in the prior art, switch 521 forwards the SIP invite message to master border controller 570. Had switch 521 dumped the call to PSTN region 552 as is done in the prior art, the call could be routed through the PSTN to PSTN region 550. Gateway 541 would have then interworked the call to VoIP network 510, and ultimately to device 523.

Master border controller 570 processes the proxy address for user device 523 and determines that VoIP network 510 is the destination network for the call. Master border controller 570 then transfers the SIP invite message to soft switch 511. Device 523 had registered with VoIP network 510 by alerting switch 511 of its presence in the network. In response, switch 511 assigned device 523 a network address. The network address could be in the form of an IP address. Switch 511 therefore stores the network address (IP address) of device 523 in association with the proxy address (sally.jones@company.com) of device 523. Switch 511 is in communication with device 523 and knows that device 523 is available for a call by an acknowledgement message from device 523.

Switch 511 holds the network address of device 523. To setup the call, switch 511 needs to provide an address for a border controller to device 523. Switch 511 queries master border controller 570 for an available border controller for the call. The query indicates the proxy address for device 523 (sally.jones@company.com). Master border controller 570 receives the query and processes the query to determine a border controller for the call. The query does not indicate the proxy origination address for the call because switch 511 does not have knowledge of the call origination point. Rather, switch 511 only knows that device 523 is the destination point for the call. However, master border controller 570 previously received the SIP invite message from soft switch 521. The SIP invite message indicated the proxy origination address and the proxy destination address for the call. Therefore, master border controller 570 can work backwards using the query from switch 511 to determine the origination point for the call. Upon determining the origination network and the destination network for the call, master border controller determines the best border controller for the call.

Figure 7:
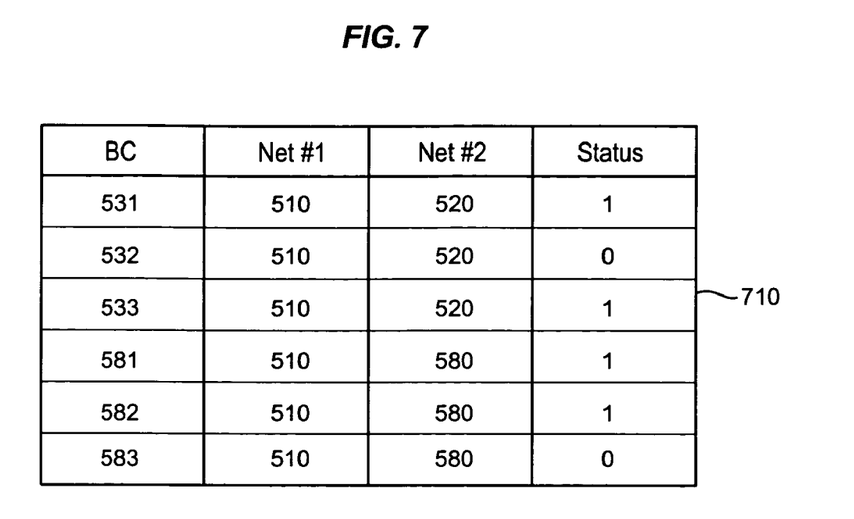
FIG. 7 illustrates a routing table in an embodiment of the invention.

FIG. 7 illustrates routing table 710 in an embodiment of the invention accessed by master border controller 570 to determine the best border controller for the call. Preferably, routing table 710 is a TRIP routing table. Routing table 710 includes rows and columns. The first column indicates a border controller. The second and third columns indicate the two networks between which the border controller of the first column is positioned. The fourth column indicates the status of the border controller of the first column. FIG. 7 only depicts four columns. However, additional columns and rows are possible indicating other data utilized for making routing decisions. Routing table 710 is not limited to the rows, columns, and data shown.

Routing table 710, in the first column, indicates border controllers 531, 532, 533, 581, 582, and 583. As depicted, border controllers 531, 532, and 533 are positioned between VoIP network 510 and VoIP network 520. Border controllers 581, 582, and 583 are positioned between VoIP network 510 and VoIP network 580. The status of each border controller is indicated in the fourth column by a one (1) or a zero (0). A one indicates that the border controller is active and available. A zero indicates that the border controller is otherwise inactive and not available. As indicated, gateways 531, 533, 581, and 582 are active and available. Border controllers 532 and 583 are inactive and unavailable. The fourth column could indicate other status indications such as capacity, transport type availability, health metrics, accounting metrics, as well as several other status indications.

Figure 8:
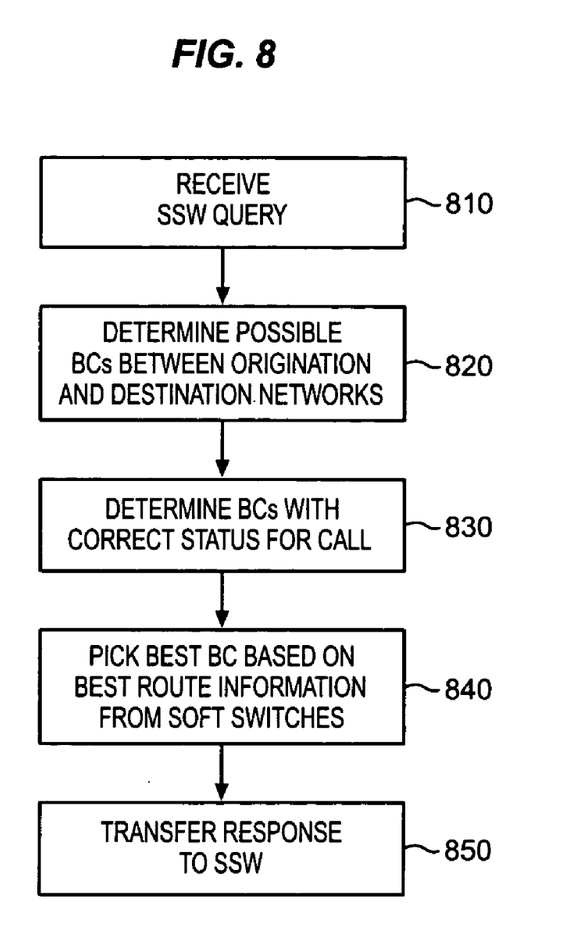
FIG. 8 illustrates the operation of a communication network in an embodiment of the invention.

FIG. 8 illustrates the operation of master border controller 570 in an embodiment of the invention. Master border controller 570 has received the query from soft switch 511 (Step 810). Master border controller 570 matched the query from soft switch 511 with the SIP invite message received earlier from switch 521. Thus, master border controller 570 has determined that VoIP network 520 is the origination network for the call and VoIP network 510 is the destination network for the call. Master border controller next determines from routing table 710 all the possible border controllers for the call between VoIP networks 510 and 520 (Step 820). The possible border controllers are border controllers 531, 532, and 533.

Next, master border controller uses routing table 710 to determine all the border controllers of border controllers 531, 532, and 533 that have the correct potential status for the call (Step 830). In this example, border controllers 531 and 533 are active and available. Border controller 532 is inactive and unavailable. Master border controller 570 then picks the best border controller of border controllers 531 and 533 based on best route information from soft switch 511 and 521 (Step 840). Lastly, master border controller 570 transfers a response to soft switch 511 indicating the chosen border controller and an address for the border controller. In this example, it is assumed that master border controller 570 picked border controller 533.

Returning to FIG. 6, soft switch 511 receives the response from master border controller 570. Switch 511 transfers a call setup message to device 523. The call setup message indicates the network address for border controller 533. Master border controller 570 transfers a call setup message to border controller 533. This call setup message indicates the network address for destination device 523 and the network address for origination device 522. Master border controller 570 also transfers a call setup message to soft switch 521. This call setup message indicates the network address of border controller 533 for the call. Soft switch 521 processes the call setup message and passes the network address of border controller 533 to device 522.

After call setup is complete, device 523 exchanges communications with device 522. In the example of a voice call, voice communications and packaged into voice packets. The packets are transmitted across VoIP networks 520 and 510. A typical packet includes header information and a payload. The header indicates an origin and a destination.

Packets traveling in the direction from device 522 to device 523 leave device 522 with an origination address indicating device 522 and a destination address indicating border controller 533. For instance, the origin could be the proxy address or network address of device 522. The destination could be the network address of border controller 533. At border controller 533, the header is changed to indicate a new destination and a new origin. The new addresses now indicate border controller 533 as the origin, and device 523 as the destination. The proxy address or network address of device 523 could be used to indicate the destination.

Packets traveling in the direction from device 523 to device 522 leave device 523 with an origin indicating device 523 and a destination indicating border controller 533. For instance, the origin could be the proxy address or network address of device 523. The destination could be the network address of border controller 533. At border controller 533, the header is changed to indicate a new destination and a new origin. The new addresses now indicate border controller 533 as the origin, and device 523 as the destination. The proxy address or network address of device 523 could be used to indicate the destination. The network address of border controller 533 could be used to indicate the origin.

Advantageously, master border controller 570 determines the best border controller for the call, rather than burdening switch 511 with the responsibility of choosing the best border controller. Additionally, master border controller 570 informs switch 521 of the chosen border controller which removes security liabilities present if switch 511 were to pick the border controller and transmit a call setup message to switch 521. Thus, both packet networks 510 and 520 can protect their networks from unauthorized access. Segregating network operations is desirable because packet networks 510 and 520 are competitive networks. Furthermore, master border controller 570 has distributed knowledge of both voice packet networks 510 and 520, thereby enabling master border controller 570 to choose the optimal border controller for the call.

Figure 9:
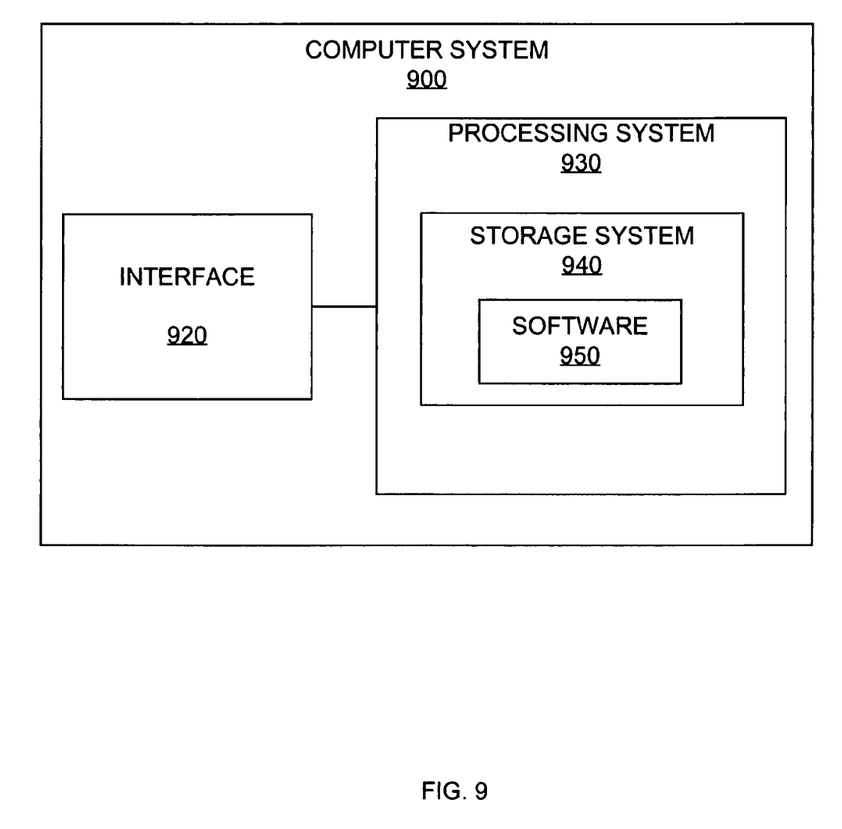
FIG. 9 illustrates a computer system in an embodiment of the invention.

Computer System—FIG. 9

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Signaling interface 920 may be distributed among multiple communication devices. Interface 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described for communication networks 300 and 500.

What is claimed is:

1. A communication network comprising:
a plurality of border controllers;
a first packet voice network;
a second packet voice network coupled to the first packet voice network by the plurality of border controllers; and
a master border controller coupled to the plurality of border controllers and coupled to the first packet voice network and the second packet voice network;
the master border controller, responsive to receiving a query from a first switch in the first packet voice network for a call between the first and second packet voice networks, processes the query to determine a first border controller for the call of the plurality of border controllers, and transfers a response to the first switch in the first packet voice network wherein the response indicates the first border controller.

2. The communication network of claim 1 wherein the first packet voice network comprises the first switch and an origination element and wherein the second packet voice network comprises a second switch and a destination element.

3. The communication network of claim 2 wherein the master border controller receives a call request message from the first switch wherein the call request message indicates a proxy origination address for the origination element and a proxy destination address for the destination element and wherein the master border controller transfers the call request message to the second switch in response to determining that the second packet voice network is associated with the proxy destination address.

4. The communication network of claim 3 wherein the master border controller transfers a call setup message to the first border controller indicating the proxy origination address and the proxy destination address for the call.

5. The communication network of claim 3 wherein the first border controller receives a packet for the call wherein the packet indicates a proxy origin in the first packet network and indicates the first border controller as a proxy destination and wherein the first border controller transfers the packet to the second voice packet network wherein the transferred packet indicates the first border controller as the proxy origin for the call.

6. The communication network of claim 5 wherein the first border controller receives the packet for the call and in response to determining the origin for the call, transmits the packet to the destination for the call wherein the packet transmitted from the first border controller indicates the first border controller as the origin for the call and indicates the destination.

7. The communication network of claim 1 wherein the master border controller is telephony routing over Internet protocol (TRIP) enabled.

8. The communication network of claim 1 wherein the plurality of border controllers are telephony routing over Internet protocol (TRIP) enabled.

9. The communication network of claim 1 wherein the origination element comprises a session initiation protocol (SIP) enabled mobile phone.

10. The communication network of claim 1 wherein the destination element comprises a session initiation protocol (SIP) enabled mobile phone.

11. A method of operating a communication network comprising a plurality of border controllers, a first packet voice network, a second packet voice network coupled to the first packet voice network by the plurality of border controllers; and a master border controller coupled to the plurality of border controllers and coupled to the first packet voice network and the second packet voice network, the method comprising:
responsive to receiving a query in the master border controller from a first switch in the first packet voice network for a call between the first and second packet voice networks, processing the query to determine a first border controller for the call of the plurality of border controllers; and
transferring a response to the first switch in the first packet voice network wherein the response indicates the first border controller.

12. The method of claim 11 wherein the first packet voice network comprises the first switch and an origination element and wherein the second packet voice network comprises a second switch and a destination element.

13. The method of claim 12 further comprising, in the master border controller, receiving a call request message from the first switch wherein the call request message indicates a proxy origination address for the origination element and a proxy destination address for the destination element and transferring the call request message to the second switch in response to determining that the second packet voice network is associated with the proxy destination address.

14. The method of claim 13 further comprising transferring a call setup message from the master border controller to the first border controller indicating the proxy origination address and the proxy destination address for the call.

15. The method of claim 13 further comprising receiving a packet for the call in the first border controller wherein the packet indicates a proxy origin in the first packet network and indicates the first border controller as a proxy destination and transferring the packet from the first border controller to the second voice packet network wherein the transferred packet indicates the first border controller as the proxy origin for the call.

16. The method of claim 15 comprising receiving the packet for the call in the first border controller and in response to determining the origin for the call, transmitting the packet to the destination for the call from the first border controller wherein the packet transmitted from the first border controller indicates the first border controller as the origin for the call and indicates the destination.

17. The method of claim 11 wherein the master border controller is telephony routing over Internet protocol (TRIP) enabled.

18. The method of claim 11 wherein the plurality of border controllers are telephony routing over Internet protocol (TRIP) enabled.

19. The method of claim 11 wherein the origination element comprises a session initiation protocol (SIP) enabled mobile phone.

20. The method of claim 11 wherein the destination element comprises a session initiation protocol (SIP) enabled mobile phone.

21. A software product for a communication network comprising a plurality of border controllers, a first packet voice network, a second packet voice network coupled to the first packet voice network by the plurality of border controllers, and a master border controller coupled to the plurality of border controllers and coupled to the first packet voice network and the second packet voice network, the software product comprising:
   software operational when executed by a processor to direct the processor to receive a query in the master border controller from a switch in the first packet voice network for a call between the first and second packet voice networks, processes the query to determine a first border controller for the call of the plurality of border controllers, and transfers a response to the switch in the first packet voice network wherein the response indicates the first border controller; and
a storage medium configured to store the software.

* * * * *